March 14, 1950
G. C. HORTON ET AL
2,500,285
AXIALLY SHIFTING TYPE PEDESTAL MOUNTED TIRE REMOVING DEVICE
Filed July 22, 1946
2 Sheets-Sheet 1
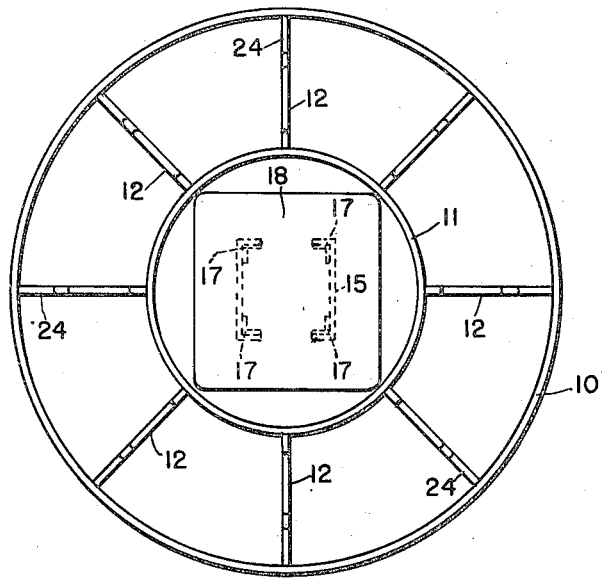
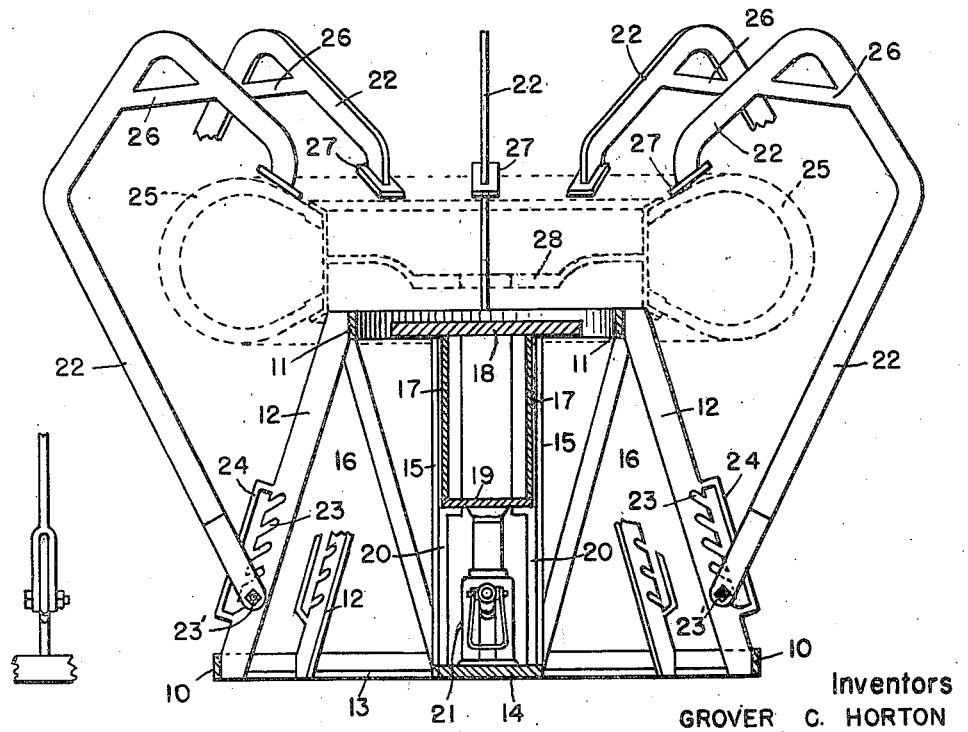
Inventors
GROVER C. HORTON
CYRUS KITCHENS
Cushman, Darby, Cushman
Attorneys

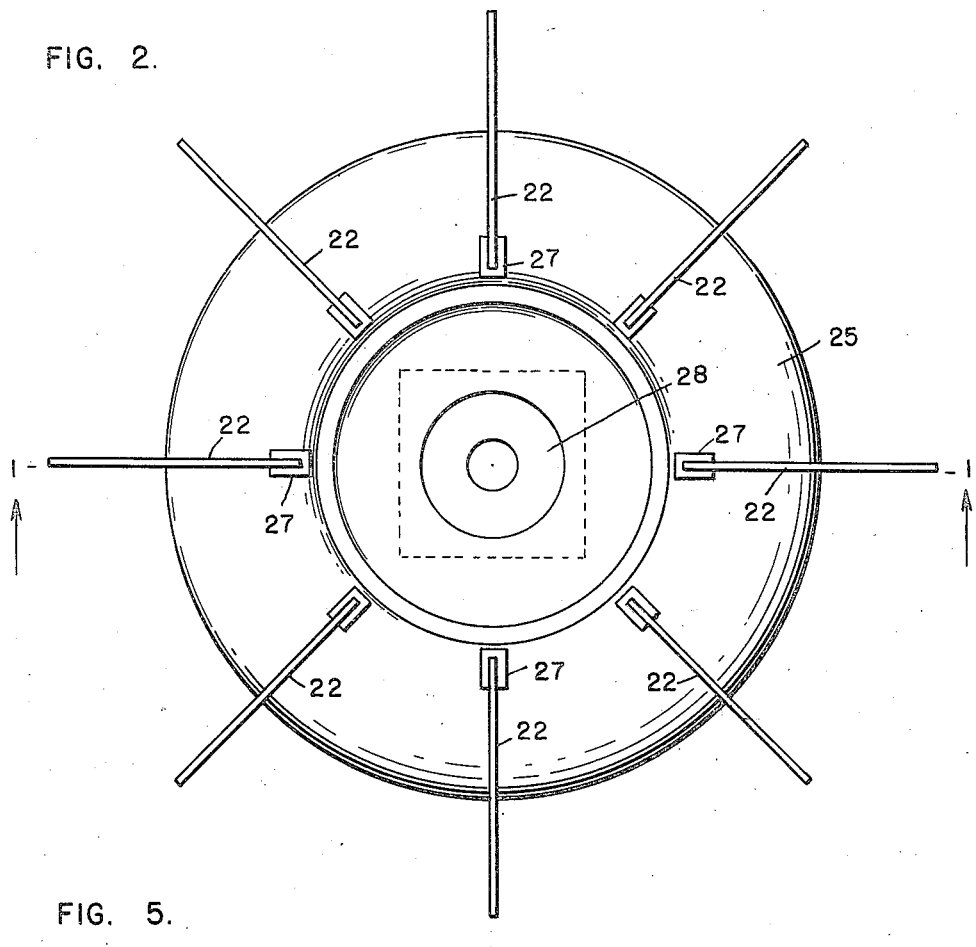
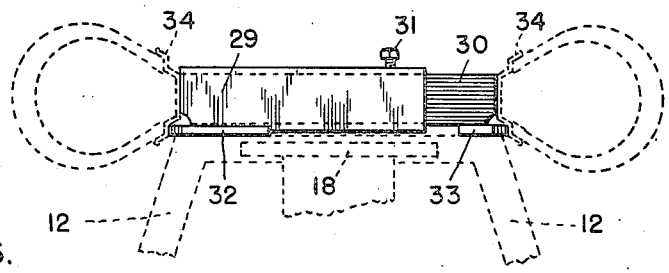
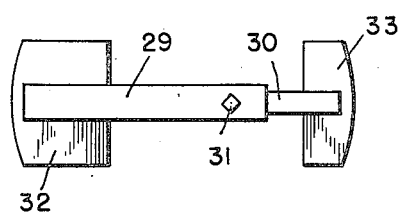

Patented Mar. 14, 1950

2,500,285

UNITED STATES PATENT OFFICE 2,500,285

AXIALLY SHIFTING TYPE PEDESTAL MOUNTED TIRE REMOVING DEVICE

Grover C. Horton and Cyrus Kitchens, Oneonta, Ala.; said Kitchens assignor to said Horton Application July 22, 1946, Serial No. 685,506

2 Claims. (Cl. 157—1.2)

This invention relates to tire removers. It has for its object to provide a device which will remove a tire completely from a wheel, or from a rim, by one action of the mechanism, as distinguished from a succession of actions imposed on succeeding sections of the tire, to the end that the operation may be expedited and step-by-step removing operations avoided.

The make-up of the remover is such that it will take care of tires of a wide range of sizes, and it so acts in removing the tires as to eliminate danger of tire injury, the pressures being uniformly distributed over the entire circumferential area of the tire, and the thrust of the parts being such that no unequal strains are applied to the tire.

The device is portable; its adjustments for size are simple; it is of rugged construction, and, by reason of its simplicity, both in construction and adjustment, it may be operated by ordinary workmen without the need of skilled operators.

In the description which follows, read in connection with the accompanying drawings, one physical embodiment of the invention is shown.

In the drawings:

Figure 1 is a view in section substantially on the line 1—1, Figure 2, parts being shown in elevation, a tire and wheel being shown in dotted lines.

Figure 2 is a view in plan, showing a wheel and the tire in place.

Figure 3 is a view in plan of the main frame of the device with the tire engaging clamps removed.

Figure 4 is a detail of the lower end of a tire engaging arm.

Figure 5 is a view in side elevation of a modified device for use with tires on demountable rims.

Figure 6 is a plan view of the device shown in Figure 5.

In the following description, numbers are applied to the drawings to designate the different parts, and the same numbers are applied to the same parts in the several views.

The device comprises a frame of generally frusto-conical shape, made up of a lower ring-like member 10 and an upper ring-like member 11 of smaller diameter, said members being coupled by inclined struts 12 suitably secured, as by welding, to the rings 10 and 11 to form the main supporting frame. The number of struts 12 may be varied, eight being here shown, the only need being to provide a sufficient number to provide a sturdy frame capable of supporting the other operating parts of the device.

Disposed crosswise of the lower ring member 10 are flat rod members 13, two being here shown, although the number may be increased, if desired. Said members 13 have, at their crossing point, a central plate 14 which forms a support for a frame 15, preferably, and as here shown, rectangular in cross-section, which frame 15 is held in place by bars 16, four being here shown, the frame 15 and its supporting bars 16 forming a support for an operating plunger. Within the frame 15 is mounted a plunger formed of angular bars 17, four being here shown. At the top of said bars 17 is a supporting plate 18, and at its bottom a plate 19 which rests upon any suitable support, as, for example, the base member 20. The bars 17 fit the corners of frame 15, and plates 18 and 19 will be secured in any suitable manner to the tops and bottoms of bars 17 so as to form a strong plunger member.

Supported at its lower end by plate 14, with its upper end engaging the lower plate 19 of the plunger, is a lifting jack 21, conventionally shown. Jack 21 may be of any suitable type, mechanical or hydraulic, and is housed within the frame 15 and in lifting position between bottom plate 14 and plunger plate 19.

Movably mounted on the struts 12 of the conical frame are tire-holding arms 22, eight being here shown, although the number may be varied. Said arms 22 are forked at their lower ends to straddle the struts 12, and are adjustable lengthwise the struts to change the range of movement of arms 22, this adjustment, as here shown, being effected by means of a cross-bolt 23' adapted to engage any one of a series of notches 23 in struts 12. A keeper 24 is provided which spans the range of notches 23 and prevents arms 22 from becoming displaced; while permitting free adjustment of the arms 22 in the notches 23.

Arms 22 are of angular form, as shown, so as to project upwardly and inwardly over a tire 25, shown in dotted lines in Fig. 1. The arms 22 are of generally U-form, so as to carry them outwardly and inwardly and give clearance for the tire 25, as shown in Fig. 1. Preferably, they will be braced at their angles, as by cross-braces 26 to insure strength, and they are provided at their ends with tire-engaging members, here shown as plates 27, which, as shown in Figs. 1 and 2, rest upon the tire 25 close to the rim of wheel 28, shown in dotted lines in Fig. 1, and in position to exert pressure, at evenly distributed points, on tire 25 near its rim engaging bead. It will be seen that the vertically spaced notches 23 are located relative to the bolts 23' on the lower ends of the arms 22, so that the bolts will register with one of the notches 23 and be moved automatically into locking engagement therewith, when the plates 27 on the upper ends of the arms 22 contact the sides of the tire 25 (Fig. 1), to maintain the arms 22 in a firm fixed engagement with the tire during the removal operation. In other words, it is unnecessary to manually adjust the arms 22 in the notches or provide extraneous means for holding or clamping the wheel to the supporting frame.

When the parts are in the positions shown in Fig. 1, with wheel 28 resting upon the ring member 11 of the frame, jack 21 will be operated to exert upward pressure on plate 19 of the plunger; the plunger will be elevated, and, through lift plate 18, exert upward pressure on wheel 28. Movement of tire 25 will be resisted by the tire-engaging members 27 on the angular arms 22, with the result that tire beads and wheel rims will be smoothly and quickly separated around the entire circumference.

The thrust of the plunger on the wheel is direct, and centrally of the wheel, and the resistance of the tire engaging arms is evenly and closely distributed circumferentially of the tire. The result is that no distorting or uneven strains are created and tire removal is accomplished with one plunger stroke, as distinguished from the step-by-step methods of removal commonly employed.

By adjusting the angular tire-engaging arms 22 on the notched struts 12, the tire-engaging members 27 may be positioned for handling a wide range of tire diameters on the same device, without the necessity of complicated adjusting parts.

For handling tires in which the rims are demountable from the wheel, the devices shown in Figs. 4, 5, and 6, is provided. It comprises two telescoping members 29 and 30 which may be lengthened or shortened for rims of different diameters, and locked in adjusted positions by a set screw 31. At the end of each of the members 29 and 30 are rim-engaging projections 32 and 33, preferably in the form of laterally extended plates, which engage the rim 34 at diametrically opposite points for action and provide extended rim contacts. The plunger and its upper plate 18, shown in dotted lines in Fig. 5, will engage the rim engaging device just described, in the same manner and with the same direct upward thrust that it exerts on the wheel and rim, heretofore described. The tire will be engaged by the angular arms as in the form shown in Fig. 1, and the resisting action will be identical. The entire make-up of the device is as heretofore set forth, the only change being that the extension member, shown in Figs. 5 and 6, takes the place of the wheel of the other form.

A particular construction has been shown and described, but it is obvious that this disclosure will suggest to others structural variations from what is here shown, which variations do not depart from the principle involved. All changes which are within the skill of the mechanic and are comprehended by the appended claims are to be regarded as within the purview of the invention.

We claim:

1. A portable tire remover having in combination, an annular base member, a concentric wheel supporting member of smaller diameter than said base member and spaced vertically therefrom, inclined struts connecting said members and having vertically spaced upwardly directed notches in their lower outer edges, said members and struts being connected to form a substantially conical supporting frame, transverse means connected to said base member, a centrally disposed bottom plate on said transverse means, a plunger support carried by said bottom plate and extending upwardly therefrom, a vertically movable plunger having a wheel engaging lift plate connected to its upper end and extending laterally from said support, said plunger having a jack plate connected to its lower end and positioned within said support and spaced above said bottom plate, a lifting jack mounted on said bottom plate and engaging said jack plate for exerting an upward thrust on the lift plate, upwardly and radially outwardly extending tire engaging arms having transverse pins at their lower ends engageable in said notches and their upper ends engaging the upper side of the tire of a wheel mounted on said wheel supporting member, the upper portions of said arms being curved so as to provide a clearance above the tire adjacent and radially outwardly of their tire engaging end portions to allow their lower ends to gravitate radially inwardly and to be automatically moved into locking engagement with an adjacent notch to maintain the tire in a fixed position on the supporting frame upon elevation of the plunger by the jack to remove the wheel from the tire.

2. A portable tire remover having in combination, an annular base member, a concentric wheel supporting member of smaller diameter than said base member and spaced vertically therefrom, inclined struts connecting said members and having vertically spaced upwardly directed notches in their lower outer edges, said members and struts being connected to form a substantially conical supporting frame, transverse means connected to said base member, a centrally disposed bottom plate on said transverse means, a plunger support carried by said bottom plate and extending upwardly therefrom, a vertically movable plunger having a wheel engaging lift plate connected to its upper end and extending laterally from said support, said plunger having a jack plate connected to its lower end and positioned within said support and spaced above said bottom plate, a lifting jack mounted on said bottom plate and engaging said jack plate for exerting an upward thrust on the lift plate, substantially U-shaped upwardly and radially outwardly extending tire engaging arms having transverse pins at their lower ends engageable in said notches and their upper ends engaging the upper side of the tire of a wheel mounted on said wheel supporting member, a keeper enclosing said notches to prevent displacement of said arms, the upper portions of said arms being curved so as to provide a clearance above the tire adjacent and radially outwardly of their tire engaging end portions to allow their lower ends to gravitate radially inwardly and to be automatically moved into locking engagement with an adjacent notch to maintain the tire in a fixed position on the supporting frame upon elevation of the plunger by the jack to remove the wheel and rim from the tire, transversely disposed telescoping members mounted on said lift plate, and having means on their outer ends for releasably engaging the tire rim, and means for holding said telescoping members in adjusted position.

GROVER C. HORTON.
CYRUS KITCHENS.

REFERENCES CITED

The following references are of record in the file of this patent:

UNITED STATES PATENTS

| Number | Name | Date |
|---|---|---|
| 1,448,211 | Grassfield | Mar. 13, 1923 |
| 1,667,351 | Levitt | Apr. 24, 1928 |
| 1,724,813 | Weaver et al. | Aug. 13, 1929 |
| 1,890,746 | O'Dell | Dec. 13, 1932 |
| 1,948,434 | Stafford et al. | Feb. 20, 1934 |
| 2,345,346 | Larson | Mar. 24, 1944 |
| 2,362,061 | Ewing | Nov. 7, 1944 |